United States Patent [19]

Nihei et al.

[11] Patent Number: 4,945,268
[45] Date of Patent: Jul. 31, 1990

[54] PERMANENT MAGNET TYPE LINEAR PULSE MOTOR

[75] Inventors: Hideki Nihei; Kunio Miyashita, both of Hitachi; Hideki Asano, Mito, all of Japan

[73] Assignee: Hitachi, Ltd., Tokyo, Japan

[21] Appl. No.: 288,123

[22] Filed: Dec. 22, 1988

[30] Foreign Application Priority Data

Dec. 26, 1987 [JP]   Japan ................................ 62-333529
Dec. 26, 1987 [JP]   Japan ................................ 62-333530

[51] Int. Cl.$^5$ ............................................. H02K 41/00
[52] U.S. Cl. ................................... 310/12; 310/49 R
[58] Field of Search .................... 310/12, 13, 14, 42, 310/43, 49 R, 44, 156; 318/135

[56] References Cited

U.S. PATENT DOCUMENTS 4,633,108  12/1986  von der Heide ...................... 310/12
4,767,954  8/1988   Phillips .................................... 310/12
4,868,431  9/1989   Karita et al. ........................... 310/12

FOREIGN PATENT DOCUMENTS 59-59063  4/1984  Japan ..................................... 310/12

Primary Examiner—William H. Beha, Jr.
Assistant Examiner—Judson H. Jones
Attorney, Agent, or Firm—Antonelli, Terry, Stout & Kraus

[57] ABSTRACT

The A phase stator and the $\overline{A}$ phase stator are opposed each other winding same phase coil thereat. The B phase stator and the $\overline{B}$ phase stator are opposed each other winding same phase coil thereat. The A phase stator and the $\overline{A}$ phase stator, and the B phase stator and the $\overline{B}$ phase stator sandwich the mover, respectively. The mover fixes the permanent magnets having small magnetized pitch on the both surfaces thereof. The permanent magnets on both surfaces of the mover comprises the first permanent magnets and the second permanent magnets. The first permanent magnets having one polarity and a predetermined interval each other along the longitudinal direction of the mover are fixed previously on the mover. The second permanent magnets are inserted to the intervals on the mover.

22 Claims, 9 Drawing Sheets

PERMANENT MAGNET TYPE LINEAR PULSE MOTOR

FIELD OF THE INVENTION

The present invention relates to a permanent magnet type linear pulse motor, more specifically, the present invention relates to a permanent magnet type linear pulse motor which is for a motor for moving a head used for a magnetic disk apparatus or an optical disk apparatus.

BACKGROUND OF THE INVENTION

A permanent magnet type linear pulse motor in this field is disclosed in, for instance, in FIG. 6 of Japanese Patent Laid-Open No. 56-74080 published on June 19, 1981 in the title of "Linear pulse motor", in which a stator provided with a permanent magnet and a mover wound coils to a magnetic pole having teeth are opposed each other.

However, the prior art has a drawback in that a friction force is generated between wheels for sliding a mover on a stator through the wheels and the stator, and vibration along a perpendicular direction of the mover is increased when a magnetic pull force generated between the stator and the mover is increased.

FIG. 1 shows a main structure of the permanent magnet type linear pulse motor of the prior art. On the stator yoke 3 in FIG. 1, a permanent magnet 4 is provided. The permanent magnet 4 arranges N pole and S pole alternatively on the stator yoke 3. The pitches of N pole and S pole on the stator yoke 3 are same to that of the movers 1 and 2. The movers 1 and 2 are wound by coils 6 and 7, respectively. The teeth of the movers 1 and 2 are arranged to have a delay of T/2 pitch, respectively, to the magnetic pitch T of the permanent magnet 4 of the stator yoke 3. The movers 1 and 2 are connected by a non-magnetic material 8. The direction and the strength of the magnetic pull force applied between the stator and the mover is changed relating to the opposed position between the teeth of the movers 1, 2 and the permanent magnet 4. In the opposed position shown in FIG. 1, magnetic fluxes shown by arrows are generated at the space between the teeth of the movers 1, 2, and the permanent magnet 4. When current flows to the coil 7 generating the flux $\Phi_c$, the magnetic flux 41 generated from the N pole of the permanent magnet 4 to the tooth of the magnetic pole 21 declining to the left as shown by the arrow is increased. The magnetic flux 42 generated from the tooth of the magnetic pole 21 to the S pole of the permanent magnet 4 declining to the right as shown by the arrow is counterbalanced by the flux $\Phi_c$ and is decreased thereby. In the space between the magnetic pole 22 and the permanent magnet 4, the magnetic flux 44 generated from the tooth of the magnetic pole 22 to the S pole of the permanent magnet 4 declining to the right is increased, and the flux 45 generated from the N pole of the permanent magnet 4 to the tooth of the magnetic pole 22 is decreased. As a result, the magnetic pull force of the stator 3 to the mover 2 is unbalanced, the thrust force directed to the right is generated at the stator 3 to the mover 2 so that the movers 1 and 2 are moved to the right. Incidentally, when current flows to the coil 6 of the mover 1 at the positional relationship shown in FIG. 1, no magnetic pull force to the mover 1 is generated to either left or right direction along the surface of the stator 3 so that thrust force is not generated between the mover 1 and the stator 3. Namely, when the teeth of the mover 1 or 2 has a delay of T/2 pitch, respectively, to the magnetic pitch T of the permanent magnet 3 of the stator yoke 3, the maximum thrust force is generated.

FIG. 2 illustrates a thrust force wave diagram of the prior linear pulse motor to the position x of the mover. When a constant current is flowed to the coils 6 and 7, the thrust force shown by the dotted line in (a) of FIG. 2 is generated to the mover 1, and the thrust force shown by the dotted line in (b) of FIG. 2 is generated to the mover 2. When the positional relationship between the movers 1, 2, and the stator 4 is as shown in FIG. 1, the position X of the mover in FIG. 2 corresponds to the reference point 0 thereat. Namely, when the direction of current flowing through the coils 6, 7 is changed over at each ½ period of the tooth pitch T of the movers 1 and 2, one directional thrust force is generated as shown by the solid line in (a) and (b) of FIG. 2, so that the linear pulse motor shown in FIG. 1 performs a linear motion.

FIG. 3 shows a relationship between the position X of the mover and the magnetic pull force $f_p$. In FIG. 3, (a) and (b) correspond to the characteristic of the movers 1 and 2, respectively. The pure magnetic pull force $f_p$ which is activated vertically to the moving direction of the movers 1 and 2 and is not contributed as the thrust force varies corresponding to the position X of the movers 1 and 2 as shown in FIG. 3. Referring to FIG. 3, when the center line of each magnetic pole of the permanent magnet 4 coincides with that of the tooth (projected portion) of the mover and the magnetic flux therebetween becomes maximum, the magnetic pull force becomes maximum without relating to the polarity of the permanent magnet 4. On the contrary, when the boundary 46 between the N pole and the S pole of the permanent magnet 4 coincides with the center line of the tooth (projected portion) of the mover and the leakage flux between the annexed poles of the permanent magnet 4 becomes maximum, the magnetic pull force becomes the smallest without relating to the polarity of the permanent magnet 4. As shown in FIG. 6, the magnetic pull force varies at each period T which corresponds to ½ of the pitches 2T of the tooth.

Since the magnetic pull force $f_p$ acts constantly to one direction, the force applied to the contacting portion (not shown) between the wheel attached to the movers and the stator is increased adding the weight of the movers to the magnetic pull force $f_p$. Namely, the friction force corresponding to the friction coefficient at the contacting portion and the movement of the movers is disturbed.

The magnetic pull force $f_p$ is proportional to the volume of the magnetic flux at the air gap between the movers and the stator. When the volume of the magnetic flux at the air gap is increased, the magnetic pull force between the stator and the movers is increased. As a result, the friction force generated between the movers and the stator is increased, so that the acceleration corresponding to the generated thrust force can not be obtained, and the movers is not able to be moved in high speed.

Referring to FIGS. 2 and 3, the relationship between the magnetic pull force and the thrust force shows that the thrust force becomes the smallest when the magnetic pull force becomes the largest. Since the phase of the thrust force and the magnetic pull force between the movers 1 and 2 have delays 180°, respectively, when the magnetic pull force of the mover 1 is maximum and the thrust force thereof is minimum, the magnetic pull force of the mover 2 becomes minimum and the thrust force thereof becomes maximum. As a result, such a drawback is raised that the rotational force around the nonmagnetic material 8 connecting the movers 1 and 2, and the mover 2 is moved up and down in a vertical line.

In the above explanation, we explained in the case that the yoke provided with the permanent magnets is used for the stator and the magnetic poles wounded by the coils and having teeth are used for the movers. The problem explained above occurs in the case that the stator and the movers are replaced.

Further, the permanent magnet type linear motor of the prior art has a drawback in the magnetization of the small pitch permanent magnets arranged alternatively relating to the polarity of N pole and S pole on the stator as explained latter.

Hereunder, we will explain the magnetization of the permanent magnets of the linear pulse motor.

Referring to FIG. 1, the thrust force of the linear pulse motor is proportional to the variation of the linkage fluxes $\Phi_A$ and $\Phi_C$ of the stator coils 6 and 7 to the positional displacement of the stator yoke 3. For attaining high thrust force of the linear pulse motor, it is necessary that the tooth pitches of the stator A phase magnetic pole 1 and the stator B phase magnetic pole 2 and the magnetic pitch of the mover permanent magnets 4 are made small, and the linkage magnetic flux variation rate is made large. The miniaturization of the magnetic pole pitch of the mover permanent magnet 3 is necessary for attaining high thrust force.

However, the conventional permanent magnets 4 provided for the mover 3 are magnetized simply by N pole and S pole alternatively as shown in FIG. 4. According to the conventional permanent magnet type linear pulse motor shown in FIG. 4, when the magnetization pitch thereof is made small for increasing the thrust force of the motor, a drawback mentioned later is raised.

FIGS. 5 and 6 show main structure of the conventional magnetization apparatus 10 for magnetizing the surface of the permanent magnet material 14.

The magnetization apparatus 10 shown in FIG. 5 carries out the magnetization of the surface of the permanent magnetic material 14 by making the surface of the tip portion of the core 13 to a predetermined magnetization pitch. The magnetic flux generated from the tip portion 9 of the magnetization apparatus 10 passes through the permanent magnet material 14 as shown by the arrow. The thicker the permanent magnetic material 14, the weaker the magnetomotive force of the permanent magnetic material becomes. Since the permanent magnetic material 14 has to be magnetized by many poles having a small pitch, the magnetization apparatus 10 carries out the magnetization by moving the core 13 a predetermined pitch and converting the magnetic flux. At that time, since the present flux shown by the solid line passes through the former magnetized portion shown by the dotted line in FIG. 6, the magnetomotive force at the former magnetized portion is weakened. As apparent from the above explanation, when the permanent magnet material is magnetized a small pitch, the lowering of the magnetomotive force can not be avoided so that sufficient performance can not be obtained.

For preventing the above-mentioned drawback, it is suggested that the permanent magnetic material divided into small rectangular is magnetized, and the magnetized small rectangular permanent magnetic material is adhered to the mover in order to obtain a sheet of small magnetized permanent magnets.

Although this method mentioned above can magnetize the permanent magnetic material sufficiently, the manufacturing accuracy and fixing accuracy of the small permanent magnet is inferior to the conventional motor. Namely, when the small permanent magnetic materials are arranged on the mover, the pitches of the permanent magnets are not same, so that sufficient performance can not be obtained by the above-mentioned conventional method.

As explained above, the conventional method in this field cannot resolve two drawbacks as follows.

(1) The permanent magnet material can not be magnetized having a small pitch and a high magnetomotive force.

(2) The permanent magnet material can not be magnetized having a small pitch and high accuracy.

In the above explanation concerning FIG. 1, we explained in the case where a permanent magnet 4 is used for the mover 3, and A phase magnetic pole and B phase magnetic pole are used for the stators 1 and 2. The problems explained in (1) and (2) mentioned above occur also in the case that the stator and the movers are replaced.

SUMMARY OF THE INVENTION

An object of the present invention is to provide a permanent magnet type linear pulse motor which is able to cancel the magnetic pull force generated between the stator and the movers thereof, prevent increasing of the friction force accompanied to the magnetic pull force, prevent the up and down vibration in a vertical line of the movers, and which is capable of high speed movement and highly accurate positioning.

Another object of the present invention is to provide a permanent magnet type linear pulse motor in which small pitch magnetic field magnets can be magnetized on the mover with high accuracy and having a high magnetomotive force.

For attaining the object of the present invention, the permanent magnet type linear pulse motor thereof comprises a yoke having a plurality of the magnetic poles of a permanent magnet alternatively disposed thereon said plurality of magnetic poles being disposed in a same pitch along the longitudinal direction of at least a first and second surface of the yoke, A phase magnetic poles which have teeth of same pitch of the magnetized pitch T of the permanent magnet and wind same phase coils on a pair of magnetic poles holding a predetermined distance to the both surfaces of the magnetic poles of the yoke, and B phase magnetic poles which have same structure as A phase magnetic poles and wind same phase coils on a pair of magnetic poles as well as A phase magnetic poles, wherein A phase magnetic poles and B phase magnetic poles have delay of T/2 pitch, relatively to the magnetized pitch T of the magnetic poles of the yoke.

Hereunder, we will explain an operation of the linear pulse motor of the present invention relating to the object thereof. Suppose that the A phase magnetic poles and the B phase magnetic poles are used for the stator and the magnetic poles of the yoke is used for the mover. In the present invention, same phase stators are faced to the mover holding a predetermined distance at both surfaces of the mover. Air gaps for generating driving forces to the mover reside in both sides of the mover. The magnetic pull force acting between the stators and the mover in one phase has same magnitude at both surfaces of the mover, and is a right angle to the air gaps between the stators and the mover. The magnetic pull force generated between the upper surface of the mover and one stator and the magnetic pull force generated between the lower surface of the mover and other stator of the same phase, are generated to opposite directions and cancel each other. Accordingly, the mover is not pulled to in one direction. The increasing of the friction loss corresponding to the increasing of the magnetic pull force generated by the stators and the mover can be prevented. Since the thrust force magnitudes generated at both surfaces of the mover in one phase are same and are generated to same direction, the thrust force is generated in center line of the mover. Accordingly, the mover is not vibrated up and down in a vertical line.

In the above explanation, we explained in the case that the A phase magnetic poles and the B phase magnetic poles are stator and the yoke magnetic pole is mover. However, this relationship is correlative. Even if the relationship of the stator and the mover is opposite, same effect mentioned above can be obtained.

For attaining the another object of the present invention, the yoke thereof comprises the first permanent magnets having one polarity among N pole and S pole of the permanent magnets and being arranged separately with a predetermined interval along a longitudinal direction on the surface of the yoke, and the second permanent magnets having another polarity and being inserted to the intervals.

Hereunder, we will explain an operation of the present invention relating to the another object thereof. The pitch accuracy of this kind of permanent magnets which arrange the small pitch N poles and S poles alternatively depends on mainly the manufacturing accuracy when the permanent magnets are attached to the yoke. In the present invention, since the first permanent magnets having one polarity among N pole and S pole are attached to the yoke previously with a predetermined distance each other along a longitudinal direction before the second permanent magnets having another polarity are attached to the yoke, it is easy that the small pitch of the first permanent magnets is maintained in high accuracy. And the second permanent magnets having another polarity can be attached easily to the intervals of the first permanent magnets. Accordingly, the fitting accuracy of the second permanent magnets can be secured and the reliability of the linear pulse motor of the present invention can be enhanced.

Further, in the present invention, since the first permanent magnets and the second permanent magnets having either N pole or S pole are fixed to the yoke, respectively, each permanent magnet of the first permanent magnets and the second permanent magnets can be magnetized with high magnetic force, respectively, without affecting to the magnetizing effect of other permanent magnet materials of the first permanent magnets and the second permanent magnets, and can be enhanced in the quality of the linear pulse motor of the present invention.

DETAILED DESCRIPTION OF THE PREFERRED EMBODIMENTS

Figure 7:
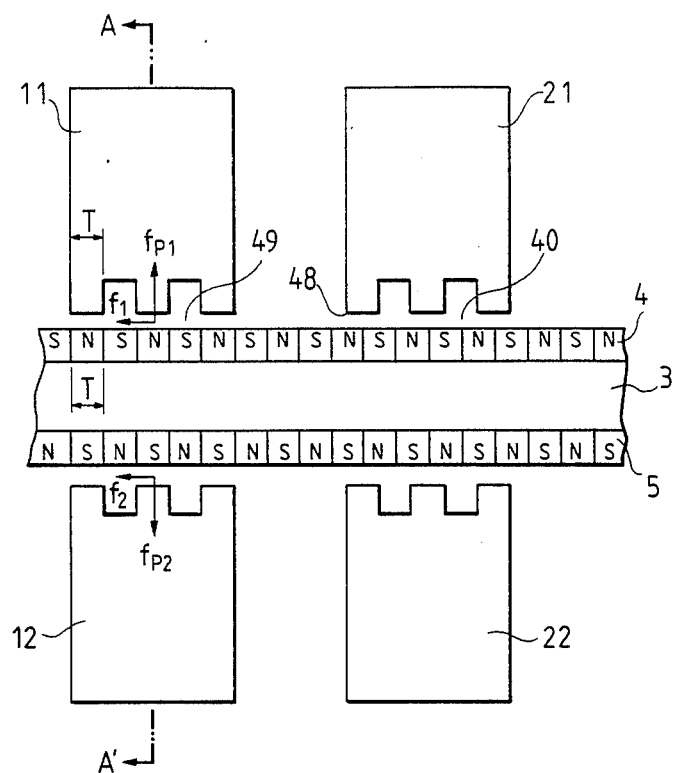
FIG. 7 shows a main structure of one embodiment of the permanent magnet type linear pulse motor of the present invention.
Figure 8:
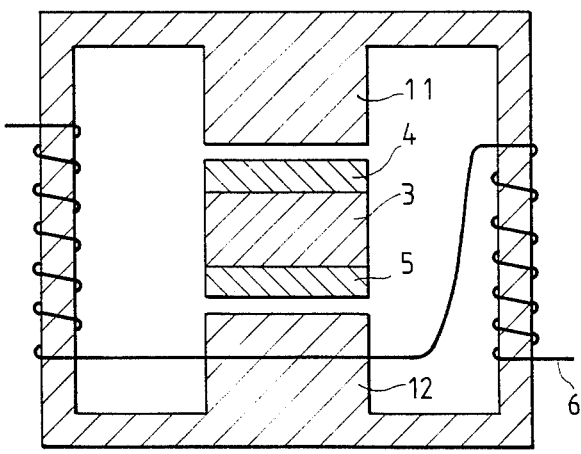
FIG. 8 shows a sectional view along A—A' line shown in FIG. 7.

A phase stator 11 and $\overline{A}$ phase stator 12 shown in FIG. 7 are wound by A phase coil 6 as shown in FIG. 8. A pair of stators 11 and 12 are opposed through their teeth.

In FIG. 7, B phase stator 21 and $\overline{B}$ phase stator 22 are wound by B phase coil (not shown). A pair of stators 21 and 22 are opposed through their teeth. The mover 1 of the conventional linear pulse motor shown in FIG. 1 corresponds to the A phase stator 11 and the $\overline{A}$ phase stator 12 shown in FIG. 7. The mover 2 of the conventional linear pulse motor shown in FIG. 1 corresponds to the B phase stator 21 and the $\overline{B}$ phase stator 22 shown in FIG. 7.

As shown in FIGS. 7 and 8, both magnetized surfaces of the mover 3 are opposed to the teeth of the stator 11 of the A phase and the teeth of the stator 12 of the $\overline{A}$ phase through the small air gaps, respectively. And also, the both surfaces of the mover 3 are opposed to the teeth of the stator 21 of the B phase and the teeth of the stator 22 of the $\overline{B}$ phase through the small air gaps, respectively. The pitch T of the teeth of the stators 11, 12, 21 and 22 is the same as the magnetized pitch T of the permanent magnet 4 of the mover 3. The A phase stator 11, the $\overline{A}$ phase stator 12 and the B phase stator 21, the $\overline{B}$ phase stator 22 have the delay of T/2 pitch. The linear pulse motor shown in FIG. 7 is operated by the same principle as well as that shown in FIG. 1.

Figure 9:
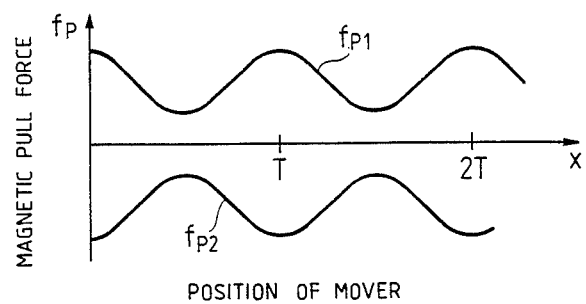
FIG. 9 shows a magnetic pull force wave diagram of the stator and the mover of the linear pulse motor shown in FIGS. 7 and 8.

In the embodiment shown in FIGS. 7 and 8, since the stators of same phase are opposed through the mover, the magnetic pull forces which function between the stators and the mover are canceled. For instance, in case of the mover position shown in FIG. 7, since the projected portions of the teeth of A phase and $\overline{A}$ phase stators 11 and 12 coincide with the magnetic poles of the permanent magnets 4 and 5 of the mover 3, the magnetic pull forces of the A phase stator 11 and the $\overline{A}$ phase stator 12 become maximum. When the edge portion of the teeth of the A and $\overline{A}$ phase stators 11 and 12 is coincided to the center line of the permanent magnets 4 and 5 of the mover as shown in the edge portion 48 of the teeth of the B and $\overline{B}$ phase stators 21 and 22 by the movement of the mover 3, the magnetic pull force acting between the A, $\overline{A}$ stators and the mover becomes the smallest. Accordingly, the magnetic pull forces $f_{P1}$, $f_{P2}$ acting between the stators 11, 12 and the mover 3 change with respect to the position of the mover 3 as shown in FIG. 9. In FIG. 9, the magnetic pull force $f_{P1}$ acting between the A phase stator 11 and the mover 3 is denoted as plus, and the magnetic pull force $f_{P2}$ acting between the $\overline{A}$ phase stator 12 and the mover 3 is denoted as minus since the direction of the magnetic pull force $f_{P2}$ is opposite to that of the magnetic pull force $f_{P1}$. Since the same magnetic pull force is generated to both up and down in a vertical line at the A and $\overline{A}$ phase stators 11 and 12, a magnetic pull force acting in only one direction is not generated. The magnetic pull forces acting between the B, $\overline{B}$ phase stators and the mover are generated in same way as that acting between the A, $\overline{A}$ phase stators and the mover. As explained above, since the magnetic pull forces are not generated between only one stator and the mover, the present invention can prevent the increasing of the friction force accompanied by the increasing of the magnetic pull force between one stator and the mover. Since the variation of the magnetic pull force is not generated, the mover 3 can be moved smoothly. Further, in both air gaps 40 and 49 on both surfaces of the mover 3, the thrust forces $f_1$ and $f_2$ are generated in same direction and same magnitude, the center point generating the thrust force coincides with the center point of the mover 3, so that the vibration along up and down direction in a vertical line can be prevented effectively.

In the above explanation, we explained that the magnetic poles wound by the coils are the stators 11, 12, 21, and 22, and the magnetic poles fixed the permanent magnets 4 and 5 are the mover 3. However, this relationship is correlative. Namely, the relationship between the stators 11, 12, 21, 22, and the mover 3 can be reversed. The same effect in the above explained FIGS. 7 and 8 can be obtained in case that the stators 11, 12, 21 and 22 are functioned as the movers, and the mover 3 is functioned as the stator.

Figure 11A:
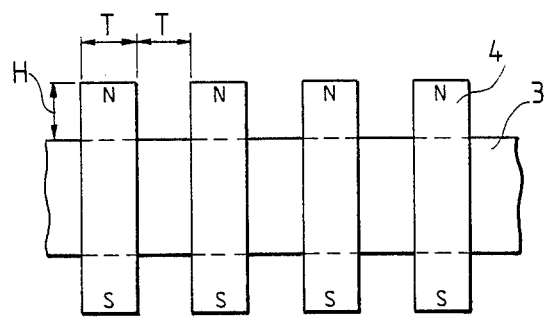
FIG. 11A illustrates the first permanent magnets of the present invention.
Figure 11B:
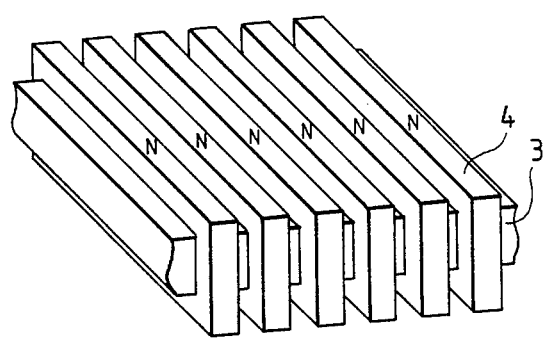
FIG. 11B illustrates a perspective view of the first permanent magnets shown in FIG. 11A.

Referring to FIGS. 11A and 11B, a plurality of rectangular type permanent magnet 4 having a width T which is equal to the small magnetized pitch and a height H and surrounding the mover 3, are fixed to the mover 3 with an interval T, which is equal to the small magnetized pitch T, to the next permanent magnet 4 along the longitudinal direction of the mover 3. According to the present invention, the small pitch permanent magnets 4 having one polarity among N pole and S pole are fixed to the yoke 3 previously holding a predetermined interval T to the next permanent magnet having same polarity. After that, another permanent magnets 5 having another polarity are fixed to the intervals having a width of T. Accordingly, the small pitch T of the permanent magnets can be maintained in high accuracy.

Figure 10A:
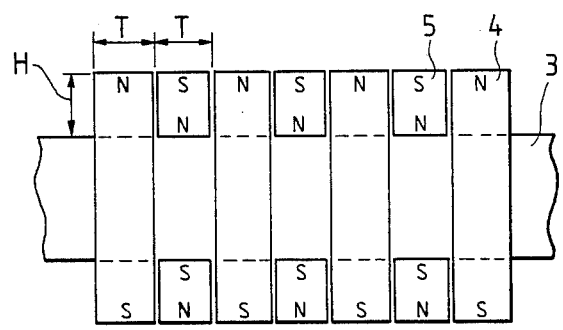
FIG. 10A illustrates magnetic materials of the present invention.
Figure 10B:
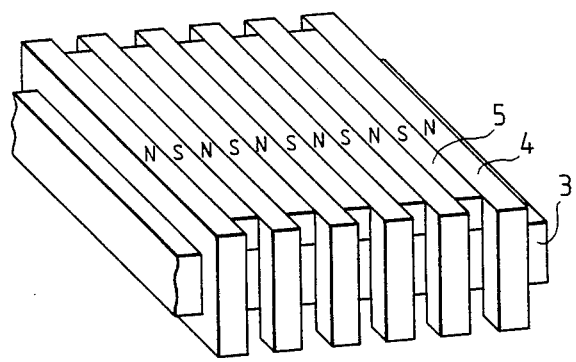
FIG. 10B shows a perspective view of the magnetic materials shown in FIG. 10A.

In FIGS. 10A, 10B, 11A and 11B, when the permanent magnets 4 and 5 are formed integrally with the mover yoke 3 by an injection below molding of a plastic permanent magnet material which is made from mixing a magnetic powder to a resin, high accuracy of the configuration and size thereof can be easily realized. In FIG. 10A, the permanent magnet 4 corresponds to the first permanent magnet and the permanent magnet 5 corresponds to the second permanent magnet mentioned before.

Figure 1:
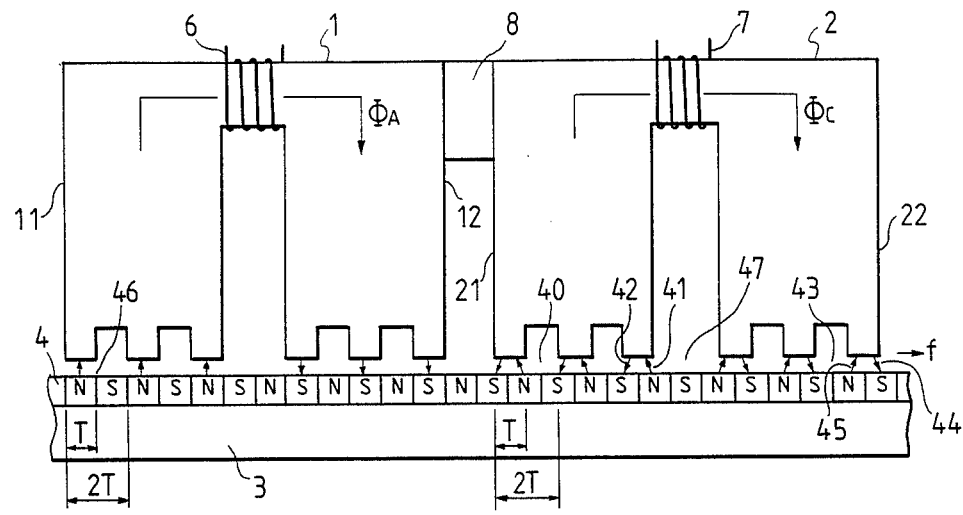
FIG. 1 shows a main structure of a conventional permanent magnet type linear pulse motor.
Figure 2:
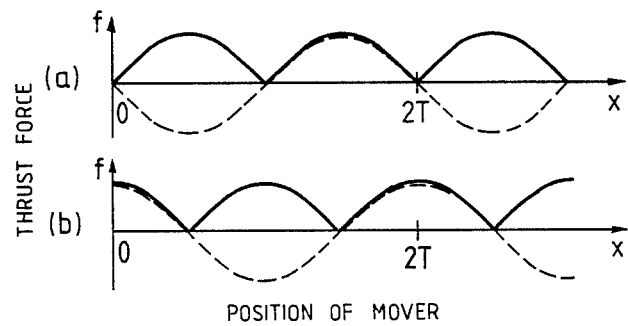
FIG. 2 shows thrust force waveforms of the linear pulse motor shown in FIG. 1.
Figure 3:
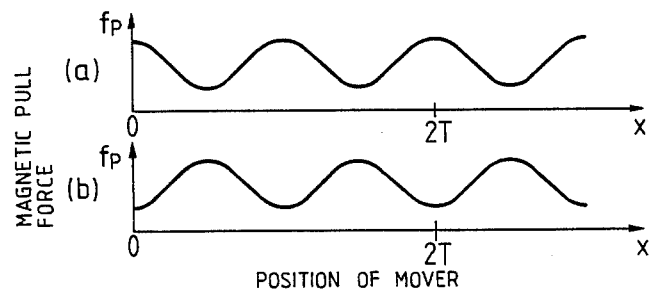
FIG. 3 shows magnetic pull force waveforms of the linear pulse motor shown in FIG. 1.
Figure 4:
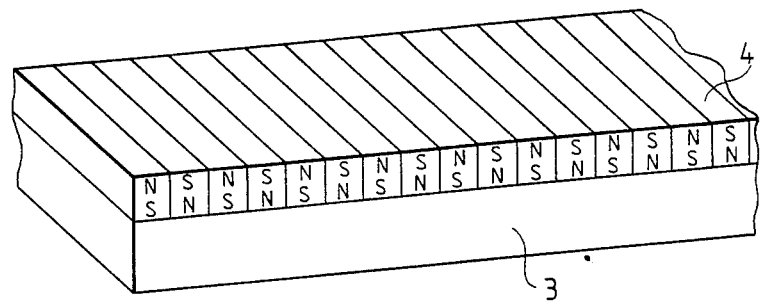
FIG. 4 shows a perspective view of a mover of a conventional permanent magnet type linear pulse motor.
Figure 5:
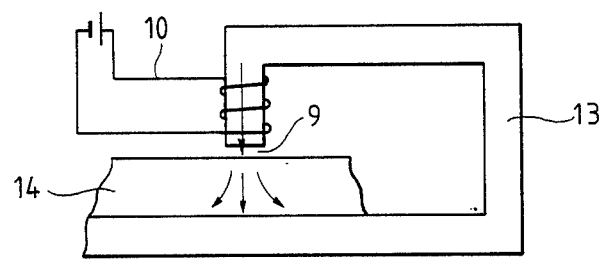
FIG. 5 illustrates a magnetization of the permanent magnetic material of the permanent magnet type linear pulse motor using a conventional magnetizing apparatus.
Figure 6:
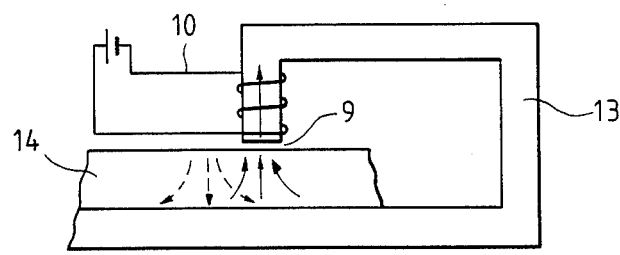
FIG. 6 illustrates relationship between the preceding magnetization and the present magnetization of the permanent magnetic material using the apparatus shown in FIG. 5.
Figure 12:
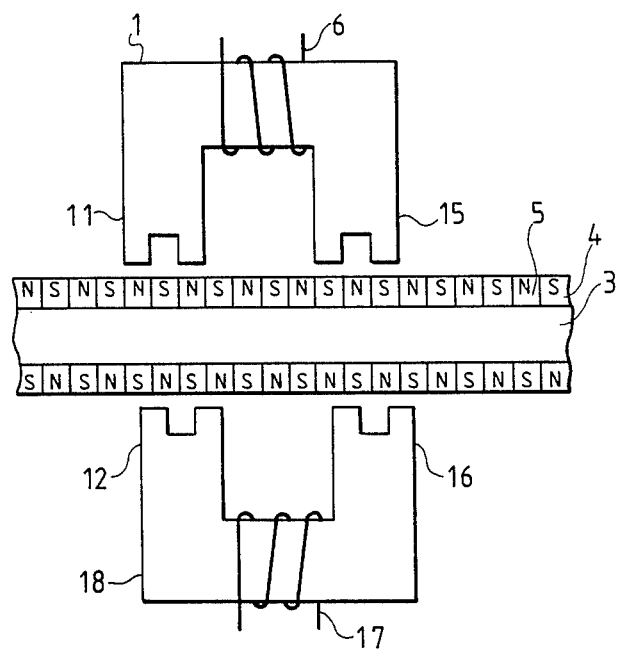
FIG. 12 illustrates a main structure of the permanent magnet type linear pulse motor having the permanent magnets shown in FIGS. 10A and 10B.

In FIG. 12, the same parts as in FIG. 1 are indicated by the same symbol.

In FIGS. 10A, 10B, 11A, 11B, and 12, we explained that the magnetic pole having the permanent magnets 4 and 5 as the mover 3. However, in FIG. 12, it is possible that the magnetic poles having the permanent magnets 4 and 5 can be used as a stator, and the A phase magnetic pole 1 and the B phase magnetic pole 12 being wound by the coils 6 and 17, respectively, can be used as movers.

In FIG. 12, we exemplified the case in which both the stators 1 and 18 are provided at both sides of the mover 3. As shown in FIG. 1, either one of the stator 1 or 18 can be provided at one side of the mover 3.

Figure 13:
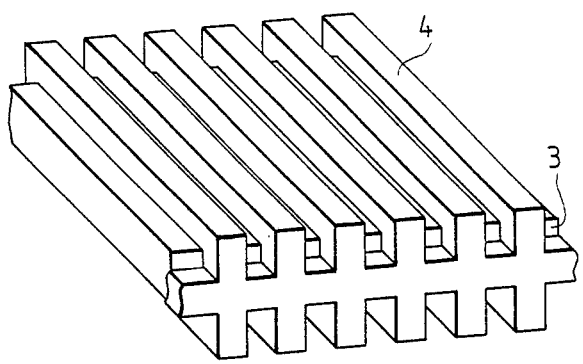
FIG. 13 illustrates a perspective view of the first permanent magnets which is attached to the yoke.

FIG. 13 shows one embodiment in which the plastic permanent magnets 4 are constructed integrally with the mover 3 at side surfaces of the mover 3 when the plastic permanent magnet 4 is formed on the mover 3.

Figure 14A:
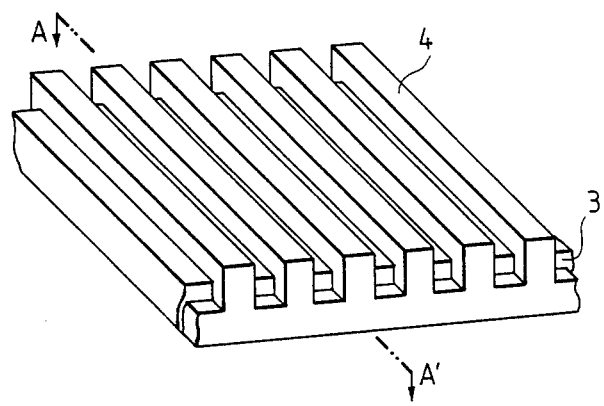
FIG. 14A illustrates a perspective view of another first permanent magnets which is attached to the yoke.
Figure 14B:
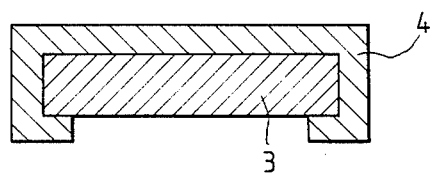
FIG. 14B shows a sectional view along A—A' line shown in FIG. 14A.

FIG. 14A shows another embodiment in which the plastic permanent magnets 4 are provided at upper and both side surfaces of the mover 3, and the plastic permanent magnets 4 are extended to reach the rear end portions of the mover 3 as shown in FIG. 14B, when the plastic permanent magnets 4 are formed to the mover 3.

Figure 15:
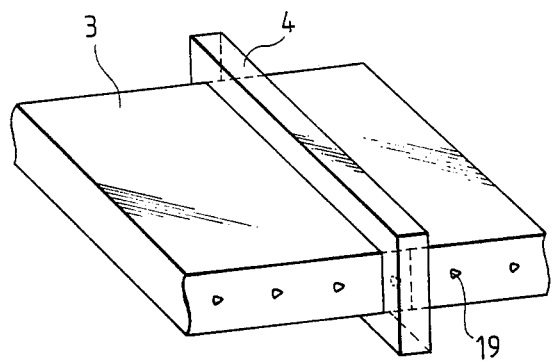
FIG. 15 illustrates a perspective view of the first permanent magnet which is fixed to the yoke by means of protrusions formed on both sides of the yoke.

Referring to FIG. 15, the protrusions 19 are provided at both side surfaces of the mover 3, and the plastic permanent magnets 4 are formed integrally on the protrusions 19 for preventing the movement of the plastic permanent magnets 4 along the longitudinal direction of the mover 3.

Figure 16:
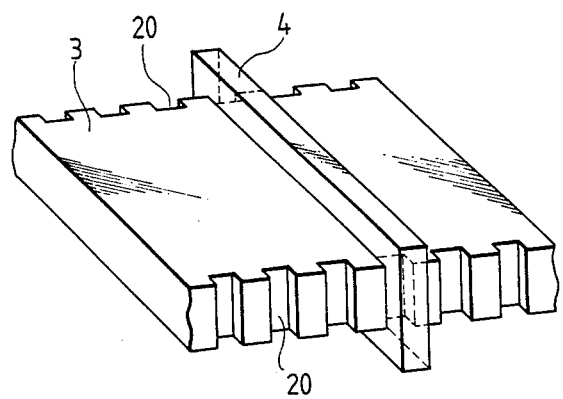
FIG. 16 illustrates a perspective view of the first permanent magnet which is fixed to the yoke by inserting it to the concaved portion formed on both sides of the yoke.

Referring to FIG. 16, the concavities 20 are provided at both side surfaces of the mover 3 having width T each other corresponding to the width T of the plastic permanent magnets 4 for preventing the movement of the plastic permanent magnets 4 along the longitudinal direction of the mover 3.

Figure 17A:
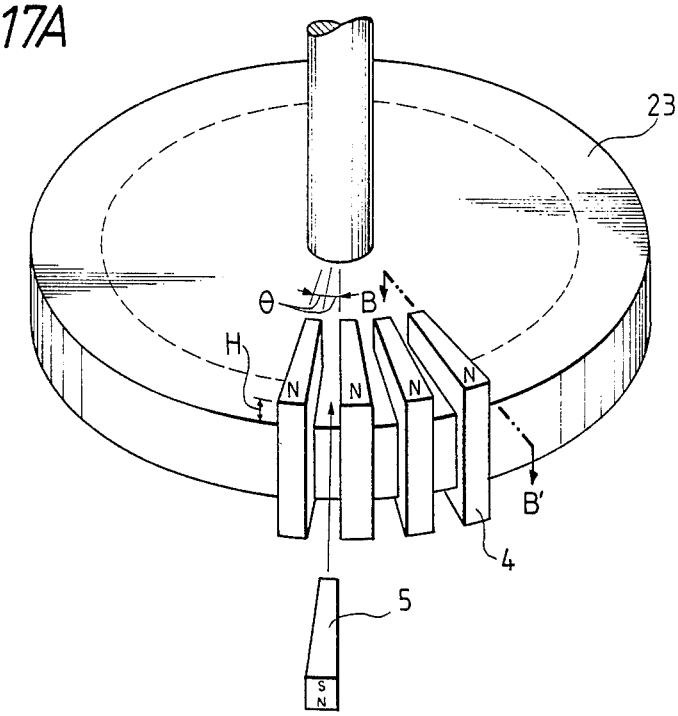
FIG. 17A illustrates a perspective view for showing the method of inserting the second permanent magnet to the space between the first permanent magnets which are fixed to the disk type yoke.
Figure 17B:
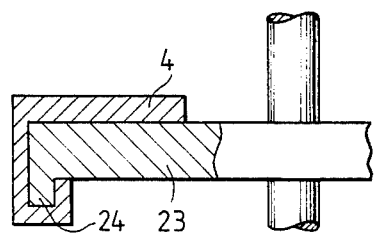
FIG. 17B shows a sectional view along B—B' line shown in FIG. 17A.
Figure 18:
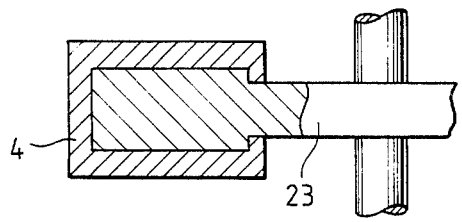
FIG. 18 shows another modified embodiment of the sectional view of FIG. 17B.

Referring to FIG. 17A, the second permanent magnet 5 is inserted to the space formed by the first permanent magnets 4 fixed to the disk type mover 23. After the plastic permanent magnets 4 are formed integrally at each same angle Θ on the mover 23, another polarity plastic permanent magnet 5 is inserted along the arrow direction. The projection 24 formed in the shape of L is provided at the tip portion of the disk 23 as shown in FIG. 17. The plastic permanent magnets 4 are elongated till the inner peripheral side of the L shaped protrusion 24 from the upper side surface of the disk 23 via the side peripheral portion of the disk. By forming the disk 23 of the linear pulse motor as shown in FIGS. 17A and 17B, the plastic permanent magnets 4 can be prevented from peeling out of the disk 23. Although not shown in FIG. 17A, the stator being wound by coil is disposed above the disk 23 opposing to the plastic permanent magnets 4 and 5.

By disposing the plastic permanent magnets 4, and 5 (not shown) on the both surfaces of the disk 23, the stators (not shown) can be disposed on the both surfaces of the rotor 23.

Figure 19A:
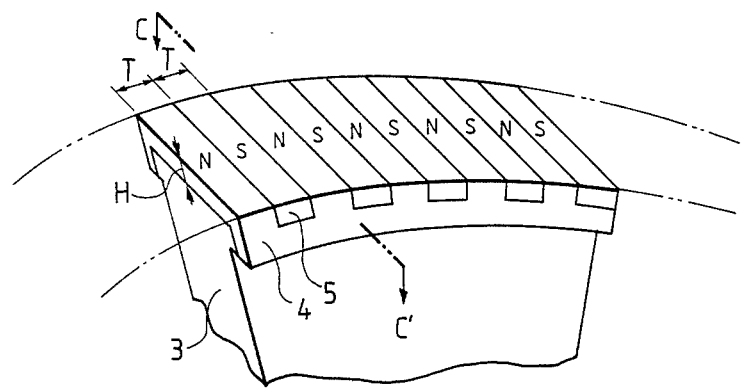
FIG. 19A illustrates a perspective view of a disk type mover which is provided to the first and second permanent magnets thereon.

Referring to FIG. 19A, two kinds of permanent magnets 4 and 5 are provided on the peripheral portion of the disk 3. Although the stator is not shown in FIG. 19A, the stator is opposed to the peripheral surface of the disk 3.

Figure 19B:
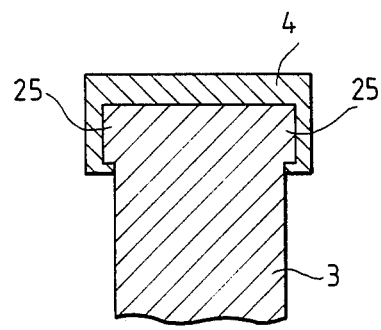
FIG. 19B shows a sectional view along C—C' line shown in FIG. 19A.

The disk 3 shown in FIG. 19A is formed in T shape in its cross section along the radial direction thereof having protrusions 25 as shown in FIG. 19B. The plastic permanent magnets 4 are formed integrally with the disk 3 covering the protrusion 25 of the disk 3. According to the disk type mover 3 shown in FIGS. 19A and 19B, the plastic permanent magnet 4 can be prevented from peeling off on account of the centrifugal force of the disk during rotation of the mover 3.

What we claim is:

1. A permanent magnet type linear pulse motor comprising a plurality of N and S permanent magnetic poles which are disposed alternatively and in a constant pitch T along a longitudinal direction of at least two surfaces of a mover; a plurality of first phase stator magnetic poles which are wound by a same phase coil to form a pair of magnetic poles, each of said stator magnetic poles having teeth whose pitch is equal to said constant pitch T of said permanent magnetic poles, said stator magnetic poles being disposed at a predetermined distance in relation to said at least two surfaces of said mover; and a plurality of second phase stator magnetic poles having the same structure as said plurality of first phase stator magnetic poles, wherein said plurality of first phase stator magnetic poles and said plurality of second phase stator magnetic poles are disposed so as to have a delay of T/2 pitch, respectively, with respect to said pitch T of said plurality of N and S permanent magnetic poles, and wherein each of said plurality of first and second phase stator magnetic poles have respective teeth opposingly arranged with respective magnetic poles of a first polarity on a first surface of said mover and of a second polarity on a second surface of said mover.

2. A permanent magnet type linear pulse motor comprising a plurality of N and S permanent magnetic poles which are disposed alternatively and in a constant pitch T along a longitudinal direction of at least two surfaces of a stator; a plurality of first phase mover magnetic poles which are wound by a same phase coil to form a pair of magnetic poles having teeth whose pitch is equal to said constant pitch T of said permanent magnetic poles, said mover magnetic poles being disposed at a predetermined distance in relation to said at least two surfaces of said stator; and a plurality of second phase mover magnetic poles having the same structure as said plurality of first phase mover magnetic poles, wherein said plurality of first phase mover magnetic poles and said plurality of second phase mover magnetic poles are disposed so as to have a delay of T/2 pitch, respectively, with respect to said pitch T of said plurality of N and S permanent magnetic poles, and wherein each of said plurality of first and second phase mover magnetic poles have respective teeth opposingly arranged with respective magnetic poles of a first polarity on a first surface of said stator and of a second polarity on a second surface of said stator.

3. A permanent magnet type linear pulse motor comprising a plurality of mover magnetic poles which have first permanent magnets having one of a N pole and S pole polarity being made unitary with a mover, said first permanent magnets each being separated by a predetermined interval along a longitudinal direction of one surface of the mover, and second permanent magnets which are inserted into said predetermined intervals between said first permanent magnets and have a pitch equal to the pitch of said first permanent magnets, said second permanent magnets having a different polarity than the first permanent magnets; a plurality of first phase stator magnetic poles which are wound by a same phase coil to form a pair of magnetic poles having teeth whose pitch is equal to a magnetized pitch T of said first and second permanent magnets, and stator magnetic poles being disposed at a predetermined distance in relation to said one surface of said mover; and a plurality of second phase stator magnetic poles having the same structure as said plurality of first phase stator magnetic poles, wherein said plurality of first phase stator magnetic poles and said plurality of second phase stator magnetic poles are arranged to have a delay of T/2 pitch, respectively, with respect to said magnetic pitch T of said mover magnetic poles, and wherein each of said plurality of first and second phase stator magnetic poles have respective teeth opposingly arranged with at least one of said first permanent magnets and at least one of said second permanent magnets on said one surface of the stator.

4. A permanent magnet type linear pulse motor comprising a plurality of stator magnetic poles which have first permanent magnets having one of a N pole and S pole polarity being made unitary with a stator, said first permanent magnets each being separated by a predetermined interval along a longitudinal direction on one surface of the stator, and second permanent magnets which are inserted into said predetermined intervals between said first permanent magnets and have a pitch equal to the pitch of said first permanent magnets, said second permanent magnets having a different polarity than the first permanent magnets; a plurality of first phase mover magnetic poles which are wound by a same phase coil to form a pair of magnetic poles having teeth whose pitch is equal to a magnetized pitch T of said first and second permanent magnets, said mover magnetic poles being disposed at a predetermined distance in relation to said one surface of said stator; and a plurality of second phase stator magnetic poles having the same structure as said plurality of first phase mover magnetic poles, wherein said plurality of first phase mover magnetic poles and said plurality of second phase mover magnetic poles are arranged to have a delay of T/2 pitch, respectively, with respect to said magnetic pitch T of said stator magnetic poles, and wherein each of said plurality of first and second phase mover magnetic poles have respective teeth opposingly arranged with at least one of said first permanent magnets and at least one of said second permanent magnets on said one surface of the stator.

5. A permanent magnet type linear pulse motor comprising a plurality of mover magnetic poles which have first permanent magnets having one of a N pole and S pole polarity being made unitary with a mover, said first permanent magnets each being separated by a predetermined interval along a longitudinal direction of at least two surfaces of the mover, and second permanent magnets which are inserted in said predetermined intervals of the first permanent magnets and have a pitch equal to the pitch of said first permanent magnets, said second permanent magnets having a different polarity from the first permanent magnets; a plurality of first phase stator magnetic poles which are wound by a same phase coil to form a pair of magnetic poles having teeth whose pitch is equal to a magnetized pitch T of said first and second permanent magnets, said stator magnetic poles being disposed at a predetermined distance to said at least two surfaces of said mover; and a plurality of second phase stator magnetic poles having the same structure as said plurality of first phase stator magnetic poles, wherein said plurality of first phase stator magnetic poles and said plurality of second phase stator magnetic poles are arranged to have a delay of T/2 pitch, respectively, with respect to said magnetic pitch T of said mover magnetic poles, and wherein each of said plurality of first and second phase stator magnetic poles have respective teeth opposingly arranged with one of said first permanent magnets and said second permanent magnets on said at least two surfaces of said mover.

6. A permanent magnet type linear pulse motor comprising a plurality of stator magnetic poles which have first permanent magnets having one of a N pole and S pole polarity being made unitary with a stator, said first permanent magnets each being separated by a predetermined interval along a longitudinal direction of at least two surfaces of the stator, and second permanent magnets which are inserted in said predetermined intervals of the first permanent magnets and have a pitch equal to the pitch of said first permanent magnets, said second permanent magnets having a different polarity from the first permanent magnets; a plurality of first phase mover magnetic poles which are wound by a same phase coil to form a pair of magnetic poles having teeth whose pitch is equal to a magnetized pitch T of said first and second permanent magnets said mover magnetic poles being disposed at a predetermined distance to said at least two surfaces of said stator; and a plurality of second phase mover magnetic poles having the same structure as said plurality of first phase mover magnetic poles, wherein said plurlaity of first phase mover magnetic poles and said plurality of second phase mover magnetic poles are arranged to have a delay of T/2 pitch, respectively, with respect to said magnetic pitch T of said stator magnetic poles, and wherein each of said plurality of first and second phase mover magnetic poles have respective teeth opposingly arranged with one of said first permanent magnets and said second permanent magnets on said at least two surfaces of said stator.

7. A permanent magnet type linear pulse motor according to claim 3, wherein at least one of said first permanent magnets are made from plastic permanent magnets.

8. A permanent magnet type linear pulse motor according to claim 3, wherein said second permanent magnets are made from plastic permanent magnets.

9. A permanent magnet type linear pulse motor according to claim 4, wherein at least one of said first permanent magnets are made from plastic permanent magnets.

10. A permanent magnet type linear pulse motor according to claim 4, wherein said second permanent magnets are made from plastic permanent magnets.

11. A permanent magnet type linear pulse motor according to claim 5, wherein at least one of said first permanent magnets are made from plastic permanent magnets.

12. A permanent magnet type linear pulse motor according to claim 5, wherein said second permanent magnets are made from plastic permanent magnets.

13. A permanent magnet type linear pulse motor according to claim 6, wherein at least one of said first permanent magnets are made from plastic permanent magnets.

14. A permanent magnet type linear pulse motor according to claim 6, wherein said second permanent magnets are made from plastic permanent magnets.

15. A permanent magnet type linear pulse motor according to claim 7, wherein the mover has protrusions on a surface thereon for holding said plastic permanent magnets.

16. A permanent magnet type linear pulse motor according to claim 8, wherein the stator has protrusion on a surface thereon for holding said plastic permanent magnets.

17. A permanent magnet type linear pulse motor according to claim 9, wherein the mover has protrusions on a surface thereon for holding said plastic permanent magnets.

18. A permanent magnet type linear pulse motor according to claim 10, wherein the stator has protrusions on a surface thereon for holding said plastic permanent magnets.

19. A permanent magnet type linear pulse motor according to claim 11, wherein the mover has protrusions on a surface thereon for holding said plastic permanent magnets.

20. A permanent magnet type linear pulse motor according to claim 12, wherein the stator has protrusions on a surface thereon for holding said plastic permanent magnets.

21. A permanent magnet type linear pulse motor according to claim 13, wherein the mover has protrusions on a surface thereon for holding said plastic permanent magnets.

22. A permanent magnet type linear pulse motor according to claim 14, wherein the stator has protrusions on a surface thereon for holding said plastic permanent magnet.

* * * * *